United States Patent [19]

Barclay et al.

[11] Patent Number: 4,488,782
[45] Date of Patent: Dec. 18, 1984

[54] ELECTROLYTIC DISPLAY DEVICE EMPLOYING METAL ION CATALYSIS

[75] Inventors: Donald J. Barclay, Winchester; Colin L. Bird, Eastleigh, both of England

[73] Assignee: International Business Machines Corporation, Armonk, N.Y.

[21] Appl. No.: 377,763

[22] Filed: May 13, 1982

[30] Foreign Application Priority Data

Dec. 24, 1981 [EP] European Pat. Off. ........ 81306153.8

[51] Int. Cl.³ ............ G02F 1/23; G02F 1/17; H01G 9/22
[52] U.S. Cl. .................. 350/357; 252/62.2; 350/363
[58] Field of Search .............. 350/357, 363; 252/62.2, 252/408.1, 500

[56] References Cited

U.S. PATENT DOCUMENTS

| 3,726,718 | 4/1973 | Mellors | 252/62.2 |
| 3,950,077 | 4/1976 | Jasinski | 350/357 |
| 4,018,508 | 4/1977 | McDermott et al. | 350/357 |
| 4,187,003 | 2/1980 | Barclay | 350/357 |
| 4,426,643 | 1/1984 | Martin | 350/357 |

OTHER PUBLICATIONS

Barclay et al., "Increasing speed of electrochromic displays", IBM Tech. Disc. Bull., 3/1976, p. 3440.
Barclay et al., "Speed Considerations for Electrochromic Displays", Jr. of Electronic Materials, vol. 8, #3, 1979, pp. 311-331.

Primary Examiner—William H. Punter
Attorney, Agent, or Firm—George E. Clark

[57] ABSTRACT

An electrolytic display device, specifically an electrochromic display based on viologen, employs metal ions in solution to catalyse the reduction of display material at the display electrodes. The metal ions are deposited faster than the display material and subsequently chemically reduce this material. Thallium (I) as the metal catalyst in combination with an oxy-anion of phosphorus accelerates the display reaction without causing undesired precipitation from the solution. Cadmium (II) in combination with sulphate anions is also an effective catalyst. Either a greater amount of display material may be deposited than without the catalyst or the same amount deposited in a shorter time.

6 Claims, 7 Drawing Figures

ELECTROLYTIC DISPLAY DEVICE EMPLOYING METAL ION CATALYSIS

FIELD OF THE INVENTION

The present invention relates to electrolytic display devices employing metal ion catalysis.

BACKGROUND ART

In one known type of electrolytic display device, a persistent coloured deposit of an electrochromatic species, present in solution, is formed on a display electrode upon passage of electric current through the solution between a contour electrode and the display electrode. The solution can be colourless or tinted in a colour which contrasts with that of the coloured species.

One class of electrochromic organic substances which have proved of especial interest are the bipyridinium compounds known as viologens. The basis of operation of an electrochromic display device using an electrolyte containing viologen dications, which are colourless and soluble, is the electrochemical reduction of the viologen dication, $V^{++}$ and the subsequent reaction with an anion $A^-$. Upon reduction of the dication at the display electrode, a stable coloured radical cation is formed as follows:

(1)

This combines with the anion to precipitate as a relatively insoluble violet coloured deposit on the display electrode according to the reaction:

(2)

Some of these viologen based systems, together with a large number of anions are described and claimed in British Patent Specification 1376799 (Philips). In a related paper by Schoot C J, Ponjee J J et al, 1973 J Applied Physics Volume 23, page 64, the particular electrochromic studied was diheptyl-viologen dibromide (N,N'-diheptyl-4,4'-bypyridinium dibromide). On reduction of this viologen, a violet precipitate is formed with the bromide anion at the display electrode. At the anode a reverse reaction occurs. It has been found that the bromide anion corrodes and discolours the metal surface of the display electrode especially when silver, which is a highly preferred metal, is used and repeated reduction/oxidation cycles result in a non-erasible deposit due to recrystallisation of the radical cation deposit.

In U.S. Pat. No. 3,950,077 to R J Jasinski (Texas Instruments), it is suggested that dihydrogen phosphate ($H_2PO_4^-$) be substituted for the bromide anion. The use of this anion has solved the recrystallisation and corrosion problems but the speed of the reactions at the electrode is substantially reduced.

In our European published patent application No. 0001912, the use of either or both hypophosphite ($H_2PO_2^-$) and phosphite ($HPO_3^{2-}$) anions is proposed, optionally in combination with bromide anions. The specification of the application indicates that, mixed with dihydrogen phosphate anions, phosphite or hypophosphite anions lead to substantial improvements in the speeds of the reactions at the display electrode, especially in the erasure of the deposited species, when compared with the use of dihydrogen phosphate alone.

However, in one particular aspect, systems including phosphate, phosphite and hypophosphite anions fall short of the performance of those having bromide anions. A measure of the speed at which a display can be generated (written) is the "take-off" time of a given electrochromic system. Take-off time is closely related to but is not necessarily the same as the classical electrochemical "transition time" which, in the case of viologen, would correspond to the complete depletion of $V^{++}$ ions at the cathode surface and to the onset of the further reduction $V^+ + e \rightarrow V°$ in the material already deposited. Take-off time is a somewhat more general term in that it relates to the observed potential rise irrespective of its cause. Like transition time, however, take-off time is dependent on the density of the applied current, the real surface area of the electrodes and the bulk concentration of electrochromic material in the electrolyte.

Take-off time is measured, in the present case, by noting the time at which the potential across the display electrode/solution interface rises sharply away from the potential associated with deposition of the viologen cation radical. A long take-off time is desirable, for it enables more material to be deposited in a single operation. A long take-off time for a given current density also implies that there is opportunity to shorten the writing time by increasing the current density even though this shortens the take-off time.

The take-off times for electrochromic materials including hypophosphite, phosphite or phosphate anions fall significantly short of the take-off times of systems including bromide anions. In our European published patent application No. 0004548 it is disclosed that modifying the surface of the display electrode in contact with the electrolyte can lead to improvements in take-off times providing the display is operated at a sufficiently high current density. Employing this technique leads to a significant reduction in the attainable write time of the display.

However, even with this improvement, the amount of viologen which can be deposited at acceptable rates, without exceeding the take-off time, is limited to around 3 mCcm$^{-2}$. If constant current driving is employed for a longer time period than that needed to pass this magnitude of charge, then irreversible reactions such as the further reduction of the viologen radical cations, $V^+$, or the evolution of hydrogen ensue. Employing a constant current of density 500 mAcm$^{-2}$ for a write time of 4 mS to deposit 2 mCcm$^{-2}$ of viologen produces a contrast ratio, against matt silver electrodes, of 2.6:1. This, while quite distinct to the eye, is barely acceptable for some applications. Even with a substantial increase in write time, the maximum attainable contrast with this system is not more than 3.6:1.

The take-off time and, more generally, the speed with which a display can be written is dependent on the concentration of the electrochromic species in solution. The relationship of speed of display writing to concentration and other factors such as diffusion coefficient is discussed in an article entitled "Speed Consideration for Electrochromic Displays" by D J Barclay, C L Bird and D H Martin (Journal of Electronic Materials, Vol. 8, No. b 3, 1979, p311). The persistent electrochromic di-alkyl viologens are only sparingly soluble in water and this limits the speed with which a display which operates by electro-reduction of these substances at a cathode can be written.

Speed considerations are particularly important in matrix-addressed displays in which display electrodes are written one row at a time. Using the figure of 4 mS given above, by way of example, for an individual write operation, a display of several hundred rows can only be written in the order of seconds. This is a severe constraint on display performance for certain applications since erasure of the whole display takes less than 150 mS. Alternatively, if write times are limited to, say, 1 mS, unacceptably low contrast ratios result.

The above referenced article mentions, at p318, the possibility of a display system in which a second electroactive species, $A^+$, is present and observes that such a system would still operate as an electrochromic display providing that the reduction of $A^+$ took place at a more negative electrode potential than the display reaction and that the reduced species, $A°$, subsequently chemically reduced the electrochromic species to its coloured form.

In an earlier article, two of the above authors had, in fact, proposed such a system for increasing the speed of electrochromic displays ("Increasing Speed of Electrochromic Displays" by D J Barclay and C L Bird, IBM Technical Disclosure Bulletin Vol. 18, No. 10, colour.

This article specifically suggests the addition of zinc (II) or cadmium (II) for this purpose to a heptyl viologen dibromide electrochromic solution. Although, in theory, the electrode reaction potentials and solubilities of these species should increase the speed of writing of a matrix addressed display, in practice the viologen was found to precipitate out of solution as a complex bromide of the metal cation. For this reason a practical display system was not achieved.

To complete the review of the prior art and for the purpose of distinguishing the present invention therefrom, reference should also be made to U.K. Pat. Nos. 1407133 and 1506560, (both ICI). These patents describe electrochromic display devices employing as the electrochromic substances p-cyanophenyl viologens in solution rather than the di-alkyl viologens which are the subject of the prior art discussed above. In addition to p-cyanophenyl viologen the solution contains ferrous ammonium sulphate which constitutes an auxiliary $FE^{++}/FE^{+++}$ redox system. The purpose of this auxiliary system is to overcome the drawback that p-cyanophenyl viologens, while readily electrochemically reducible, are not electrochemically re-oxidisable. Instead of being electrochemically oxidised, the modified viologen deposit is chemically oxidised by the ferric ions of the auxiliary redox system, in order to erase the display. However, no iron is plated onto the display electrodes and ferrous ions cannot reduce the modified viologen to its coloured form.

DISCLOSURE OF THE INVENTION

As indicated in the above discussion, prior art electrochromic display devices of the kind referred to are limited in respect of speed of writing and contrast ratio. Although metal-ion catalysis has been suggested in principle as a way of overcoming these drawbacks, it has not hitherto been successfully employed. The present invention is based on the discovery of certain metal ion/anion pairs which will catalyse an electrochromic display reaction without causing precipitation from the solution.

Accordingly, the invention provides an electrolytic display device of the kind in which a visually observable persistent deposit of an ionic display material, present in solution, is formed on a display electrode upon passage of electric current through the solution between a counter electrode and the display electrode, the solution comprising display material cations, anions, and metal ions, which metal ions undergo electrolytic reduction at a display electrode potential more negative than the reduction potential of the display material cations, the metal in its reduced state being effective to reduce chemically the display material cations, characterised in that the metal ion/anion pair is selected so as not to cause precipitation from the solution.

The general principle by which metal ion catalysis operates is illustrated by the following reactions:

where V is a viologen (bipyridinium) group, X is an anion, M is a metal atom and e represents an electron:

  (3)

  (4)

  (5)

The rate at which reaction (3) takes place at an electrode potential E1 is relatively slow because of the low flux of the viologen dications as a result of their low solubility and the high resistance of the deposit. Reaction (4) takes place much more rapidly at an electrode potential E2 which is negative of E1. Thus, the bulk of charge passed is consumed in reaction (4) in which the metal $M°$ is plated on the cathode. Once the write current has stopped, the plated metal chemically reduces viologen dications to radical cations leading them to precipitate on the electrode as the coloured compound VX and allowing reformed metal ions to pass back into solution.

Although not absolutely necessary in principle, it is preferable that the metal ions are more soluble than and present in greater molar concentration than the ionic display material.

The preferred metal ion for use with bipyridinium (specifically di-heptyl bipyridinium) cations is thallium and the associated anion is preferably an oxy-anion of phosphorus, specifically a mixture of hypophosphite and phosphate anions.

The preferred concentration of these critical components are:

di-heptyl bipyridinium: 0.05 molar
thallium (I): 0.2 molar
hypophosphite: 1.0 molar
phosphate: 0.8 molar However a range of thallium concentrations from zero to 0.3 molar have been tried and contrast rations of up to 6.4:1 (equivalent charge 5.9 mCcm$^{-2}$) have been achieved with a write time of 4 mS. Alternatively, contrast ratios of 4:1 have been achieved with write times of 2 mS. Such display devices containing thallium in solution are also found to have greater image persistence, without significantly increased erasure times, and to be operable over a much wider temperature range (0°–48° C.) than hitherto.

An alternative system, also employing bipyridinium cations, which has been found to work has cadmium (II) as the metal-ion catalyst and sulphate anions. The cadmium/sulphate pair does not precipitate from solution. Charges of 6.3 mCcm$^{-2}$ have been written in 4 mS giving contrast ratios of 7.9:1.

The principle advantage of the invention is that it enables the deposition of a greater amount of display material than would otherwise be possible at the same current density and for the same write current time. The total time to produce the display effect is, of course, increased by the time taken for the chemical reduction of the display material. However, in the case of a line by line addressed matrix display, this time is not significant in comparison to the time taken to write the complete display matrix.

DETAILED DESCRIPTION

Figure 1:
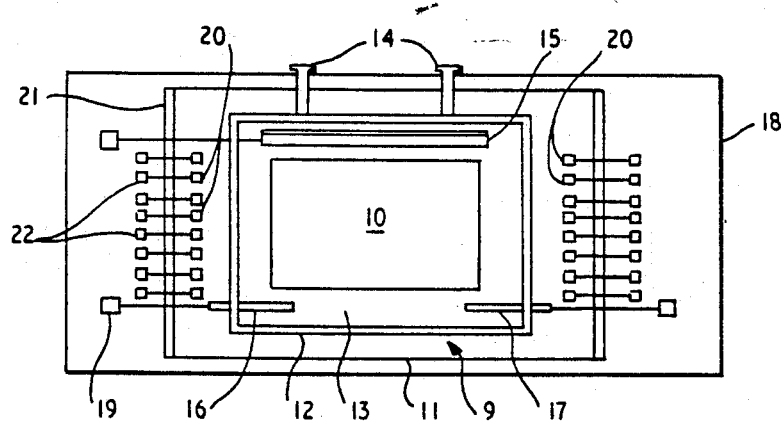
FIG. 1 is a plan view of an electrochromic display device according to the present invention.

In FIG. 1 is shown an electrochromic display device of the kind in which metal ion catalysis has been employed.

The display device comprises a cell 9 in which an array 10 of matt silver display electrodes is formed over an array of field effect transistors integrated on a silicon wafer 11. The display electrodes 10 are sealed within a rectangular frame 12 and cover 13 made of transparent acrylic material. Filler tubes 14 passing through one wall of the frame enable the cell to be filled with an aqueous electrolyte comprising a mixture of 1,1' di-heptyl-4, 4'-bipyridinium dications, phosphate and hypophosphite anions and thallium ions. The cell is subsequently sealed. The counter electrode is an L section platinum foil strip 15 on which platinum black has been deposited and is located along one edge of the display cell. A pair of reference electrodes 16 and 17 are located adjacent the opposite edge of the display and consist of fine silver rods about 1 mm in diameter. These rods pass through and are sealed into the frame 12 of the cell.

The wafer 11 and display cell are mounted on a copper block heat sink (not visible) which itself is mounted on a printed circuit board 18 carrying circuitry (not shown). Wires to pads 19 on the printed circuit board connect the reference electrodes to external circuitry on the board. The counter electrode 15 is similarly connected by wire to a pad on the circuit board.

Figure 2:
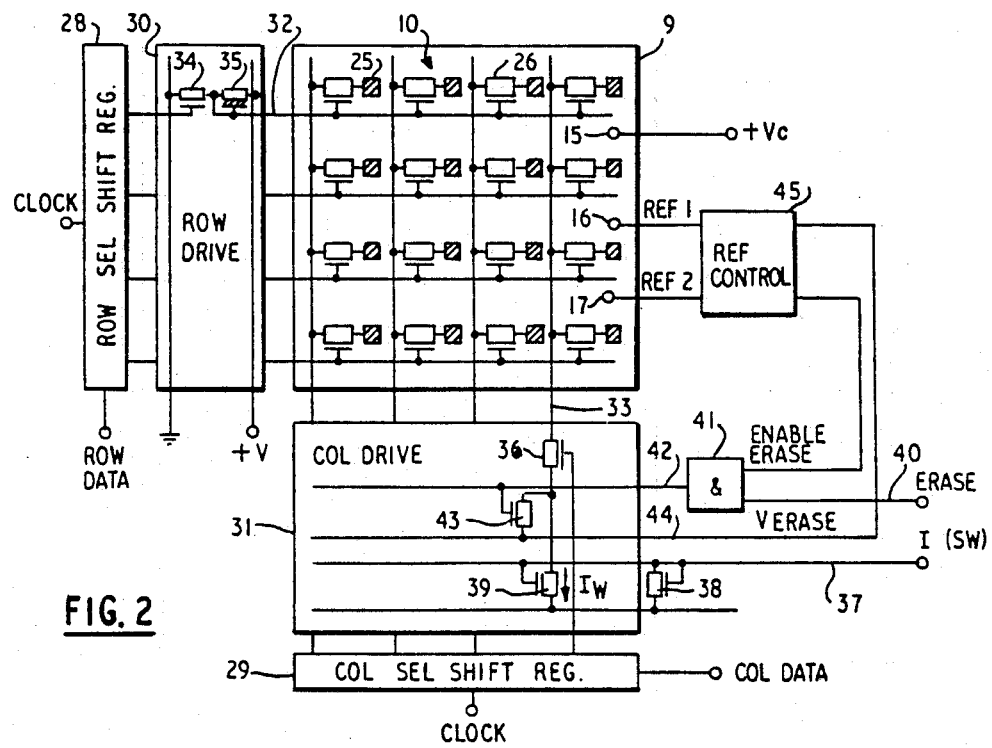
FIG. 2 is a schematic electric circuit diagram of the display device of FIG. 1 including drive circuitry for writing and erasing the display.

The silicon wafer 11 includes not only the FET matrix for switching the pels but also row and column select and drive circuits shown in FIG. 2. External connection to these circuits is made by way of pads 20 on the periphery of the wafer outside the frame. Fine wires connect these pads over an insulating sleeve 21 on the edge of the wafer to a complementary array of pads 22 on the printed circuit board.

The display electrodes 10 are individually connected to the drain of an associated underlying FET by via metallurgy. The FET's themselves are formed on the silicon wafer 11 and overlaid with inorganic and organic passivation layers. Further details of the structure of the display electrodes forming array 10 and their connection to the underlying FET matrix in wafer 11 is given in U.S. Pat. No. 4,426,643.

FIG. 2 is a schematic electrical diagram of the cell 9 of the device of FIG. 1 and the associated drive circuitry for writing and erasing the display. Within the cell, are shown the reference electrodes 16 and 17, the platinum black counter electrode 15, connected to a source of potential $+V_c$, and the array 10 of identical matt silver display electrodes 26, each constituting one picture element or "pel". For ease of illustration only sixteen pels are shown, arranged in a four by four array. In practice a much larger number would be employed.

The write and erase operations of the display cell 9 are controlled by associated display drive circuits in response to externally supplied control signals. The write operation is a constant current process and the erase operation is potentiostatic, according to well known general principles.

Each of the pels 25 may be individually selected for writing by means of its associated FET 26 which behaves as a switch. The individual pels are identified by means of row and column data loaded into shift registers 28 and 29. The row and column shift registers control associated row and column drivers 30 and 31 which activate selected row and column lines 32 and 33 to the gates and sources respectively of the FET matrix. Thus if a row line 32 is activated, that row of FET's connect the pels 25 of the row to any write or erase currents flowing on column lines 33.

The row drive circuit 30 comprises a string of transistor pairs, such as enhancement mode device 34 and depletion mode device 35, each associated with one stage of the shift register 28. These two devices form a line driving inverter which isolates the shift register circuit from the loading of the row select line.

The column driver 31 is slightly more complicated in that it has to provide both erase and write current to the lines 33. Selection of a line 33 for either operation is by means of a transistor switch 36 in accordance with the contents of an associated shift register stage.

The write operation is selected by switching a reference current $I_{(SW)}$ to the write line 37. Transistor 38 controls the gate voltage of a number of coupled transistors 39 such that they act as current sources of magnitude equal to the reference current, one for each column. Thus, if a selection transistor 36 is on, a constant current, $I_w$, will be drawn from the associated column line 33. The writing process is such that the display is written one row at a time so that only a single FET 36 in any column can be on at any given time.

The potentiostatic erase process is also controlled by row and column drivers and can be a block operation. In other words all pels, both written and unwritten, in an area to be erased are selected by loading the row select and column select shift registers 28 and 29 with the appropriate data pattern. The erase operation is selected by the application of an externally generated ERASE signal to line 40. If an ENABLE ERASE signal has been generated by a control circuit 45 an AND gate 41 raises a line 42 to switch on a string of transistors 43. These transistors, when switched on, connect the potentiostatic erase voltage $V_{ERASE}$ applied on a line 44 to all the selected column lines 33 via transistors 36. The potentiostatic erase voltage is generated from the solution potential sensed by reference electrodes 16 and 17 by an offset amplifier in reference control circuit 45. Because the potentiostatic erase process is self limiting, no damage results from the selection and connection of unwritten as well as written pels to the erase potential. The operation of reference control circuit 45 is described in out European patent application No. 80302193.0 and forms no part of the present invention.

The cell of FIGS. 1 and 2 is filled with an electrolyte comprising an aqueous solution of di-heptyl bipyridinium cations, phosphate and hypophosphite anions and thallium ions to accelerate or catalyse the display reaction according to the above stated principles. When constant current writing the display of FIG. 1, according to the method of FIG. 2, at a current density of 1 amp cm$^{-2}$, the potential of the display electrodes 25 is driven sufficiently negative with respect to the viologen coated reference electrodes 16 and 17 that it falls below the potential at which the thallium is reduced at the display electrode. Consequently, thallium metal is plated on the electrodes. Some viologen is reduced initially but, becaue of its relatively low concentration, the reaction rate is mush slower. The reactions believed to be taking place are:

$$V^{++} + e \rightarrow V^+ \tag{6}$$

$$V^+ + H_2PO_4^- \rightarrow VH_2PO_4 \tag{7}$$

$$V^+ + H_2PO_2^- \rightarrow VH_2PO_2 \tag{8}$$

$$Tl^+ + e \rightarrow Tl^* \tag{9}$$

After the write pulse has finished, the plated thallium is able to reduce further viologen chemically according to the further equations:

$$Tl^* + V^{++} + H_2PO_4^- \rightarrow Tl^+ + VH_2PO_4 \tag{10}$$

$$Tl^* + V^{++} + H_2PO_2^- \rightarrow Tl^+ + VH_2PO_2 \tag{11}$$

It is by means of the latter reactions that the bulk of the precipitated viologen phosphate and hypophosphite are formed, the re-oxidised thallium passing back into solution.

The write process is electrochemically reversible and the displayed image is erased by the potentiostatic method described in connection with FIG. 2. Since, when written, there is little, if any, thallium left in the deposit, erasure proceeds by the reverse of reactions (7), (8) and (6).

Thallium catalysis has greatly extended the capabilities of the display device of FIGS. 1 and 2. Experiments have been conducted, over a range of solution compositions and write/erase cycles, to measure the photopic contrast ration and amount of viologen deposited. For viologen concentrations of 0.05-0.1 molar, P(I) concentrations of 1.0-1.1 molar and P(V) concentrations of 0.8-1.0 molar, the thallium concentration has been varied from zero up to 0.3 molar. The solution pH's were in the range of 5.1-5.2 and the operating temperature from 30° up to 48° C.

For solutions containing 0.5M viologen and 0.2M thallium, the passage of charge densities in the range 1.2-0.6 mCcm$^{-2}$ resulted in initial photopic contrast ratios ranging from 1.9-6.0 which decreased by approximately 0.8 over a 60 second hold period. This range of charge density was achieved by appropriate combinations of write times between 2 and 6 mS and current densities between 0.25 and 1.5 Acm$^{-2}$. The written image took between 30 and 40 mS to erase by holding the display electrode at +350 mV with respect to the viologen redox potential. These contrast ratios were achieved at operating temperatures of between 30° and 40° C. With a thallium concentration of 0.3M, a slightly higher contrast ratio of 6.4 was achieved for a passage of charge of 5.9 mCcm$^{-2}$.

In comparison, for substantially the same display without thallium in solution but with twice the viologen concentration the passage of 4 mCcm$^{-2}$ charge density produced an initial contrast ratio of only 3.6 and the relative decline in contrast ratio was higher over 60 seconds. The viologen equivalent actually deposited could not be increased beyond 3 mC.cm$^{-2}$, the further charge passed presumably going to side reactions.

The maximum temperature at which the non-thallium display could be operated without deleterious effects was 32° C. Above that temperature a blue haze formed around the display electrodes. However, the catalysed display could be operated at least up to 45° C. without such an effect being observed. It was also found that the light scattering effect, which is the basis of the display described in European patent application No. 0 069 174-al occurs at temperatures between 35 and 45° C. for thallium solutions whereas it was limited to a very narrow temperature range 29°-33° C. for the non-thallium solutions of the prior art.

Lifetime of the displays has been tested by cycling them through a 4 mS write period at a current density of 1 Acm$^{-2}$, holding for a variable period of 2 to 30 seconds and erasing potentiostatically at the potential of +350 mV with respect to the viologen redox potential. Complete reversibility of the display has been achieved over more than 700,000 cycles.

The display cell of FIGS. 1 and 2 has also been operated with a di-heptyl bipyridinium sulphate solution catalysed by cadmium. In this case the passage of 6.3mCcm$^{-2}$ charge density produced a contrast ratio of 7.9:1. The viologen dication concentration was again 0.05 molar. The sulphate anion was in 1.25 molar concentration and the cadmium 0.1 molar.

Metal ion catalysis has also been demonstrated with nickel in a bipyridinium phosphate/hypophosphite solution. However, the green colour of the solution was considered unacceptable for display purposes.

Although only di-heptyl bipyridinium compounds have been tested, it is predicted that metal ion catalysis by thallium or cadmium will be applicable to the other di-alkyl viologens such as octyl, nonyl and decyl. Indeed, one benefit of metal ion catalysis may be to render practicable displays employing these viologens which were previously impracticable because of their very limited solubility.

Two preferred examples of display devices according to the invention will now be described, after first describing a Comparative Example of a prior art uncatalysed display device.

COMPARATIVE EXAMPLE

Potassium dihydrogen phosphate was added to an aqueous solution of di-heptyl bipyridinium hypophosphite, which had been made from the bromide by an ion exchange reaction. The pH of the solution was adjusted to 5.2 by the addition of sodium monohydrogen phosphate. The composition of the principal components of this solution were:

di-heptyl bipyridinium dication: 0.1 molar

P(I)(hypophosphite): 1.0 molar
P(V)(phosphate): 0.8 molar

This solution was introduced into a display cell having a 7×9 array of matt silver display electrodes, a platinum black counter electrode and a silver reference electrode. The display cell was then hermetically sealed.

In a series of experiments, a constant current, which was successively increased from 0.25 Acm$^{-2}$ to 1.0 Acm$^{-2}$, was passed between the counter electrode and selected display electrodes for a period of 4 mS to cause the reduction of successively increased amounts of viologen and its deposition on the selected electrodes as the phosphate and hypophosphite. Between each experiment, the display was erased potentiostatically by driving the display electrodes to +350 mV with respect to the reduction potential of the viologen radical cation as determined by the reference electrode.

Figure 3:
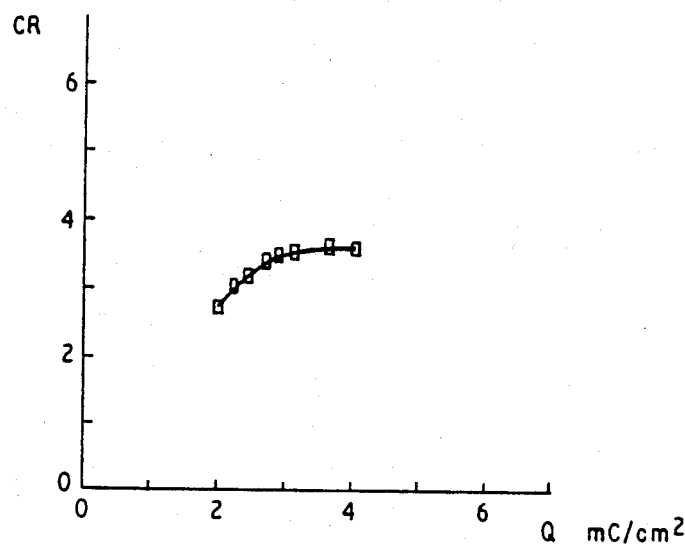
FIG. 3 is a graph, for a given total write time, of the variation of contrast ratio with applied charge density for a display device similar to that of FIGS. 1 and 2 employing a prior art electrochromic solution.

In each experiment, brightness measurements of both the written and unwritten electrodes were made with a spotmeter and a photopically corrected contrast ratio derived from the measurements. The temperature throughout the experiments was 30° C. FIG. 3 shows the measured variation of contrast ratio with applied charge. It can be seen that the contrast ratio rose from 2.7 to 3.6 as the applied charge density was increased from 2 to 4 mCcm$^{-2}$. However it will be noted that beyond a charge of 3 mCcm$^{-2}$, no increase in contrast ratio was observed, indicating the onset of side reactions.

In subsequent experiments to investigate the onset of side reactions, the display was rapidly cycled through a write step of 4 mS at a current density of 0.75 Acm$^{-2}$ followed by a hold period of about 1 second and then potentiostatically erased by driving the display electrodes to +350 mV with respect to the viologen redox potential. The display erased, under these conditions, in about 30 mS. After 200 cycles of operation, hydrogen evolution could be observed as bubbling at the display electrodes.

However, under less rigorous conditions with the current density reduced to 0.5 Acm$^{-2}$ for a write time of 4 mS and a variable hold time of between 2 and 30 seconds, the display was operated for over 300,000 cycles. The contrast ratio in this case was reduced to 2.7 to 1.

The above experiments were carried out in the simple 7×9 array cell for experimental convenience. However the experiments have also been repeated, as far as practicable, with the same solution in a display device of the kind shown in FIGS. 1 and 2.

EXAMPLE 1

An electrolyte for use in a display device according to the invention was made up as follows. Thallium carbonate was dissolved in phosphoric acid and potassium dihydrogen phosphate added. The solution pH was adjusted to 5.2 with sodium monohydrogen phosphate. Di-heptyl bipyridinium hypophosphite was then added to the solution and sodium hypophosphite was added subsequently.

The concentration of the critical components of this solution were as follows:

di-heptyl bipyridinium dication: 0.05 molar
thallium (I) 0.2 molar
P (I): 1.0 molar P (V): 0.8 molar This solution was introduced into a display cell of same type as in the Comparative Example, having a 7×9 array of independently addressable matt silver display electrodes, a platinum black counter electrode and a silver wire reference electrode. After the cell had been filled it was hermetically sealed.

Figure 4:
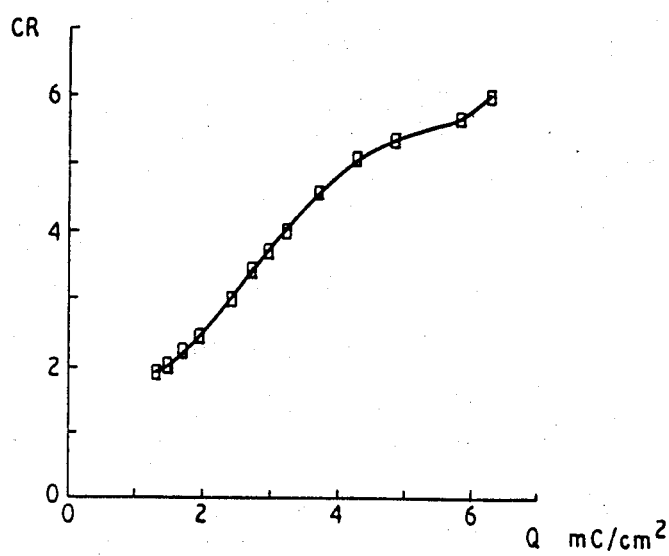
FIGS. 4, 5 and 6 are graphs, for different total write times, showing the variation of contrast ratio with applied charge density for a display device similar to that of FIGS. 1 and 2 employing an electrochromic solution catalysed by thallium according to the invention.
Figure 5:
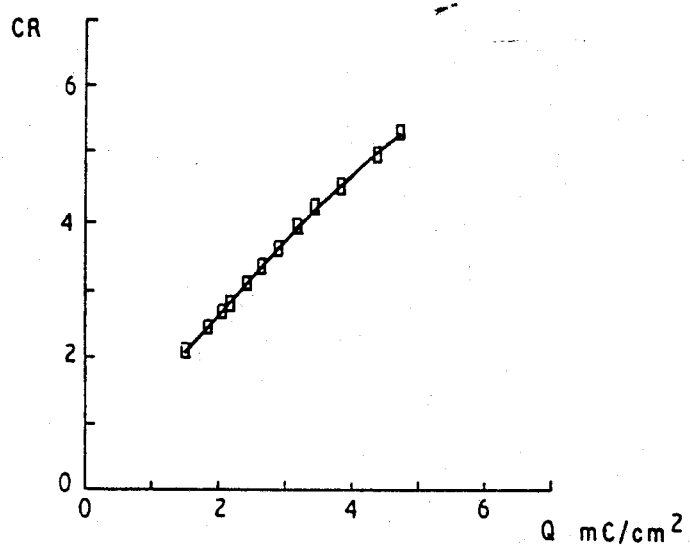
Figure 6:
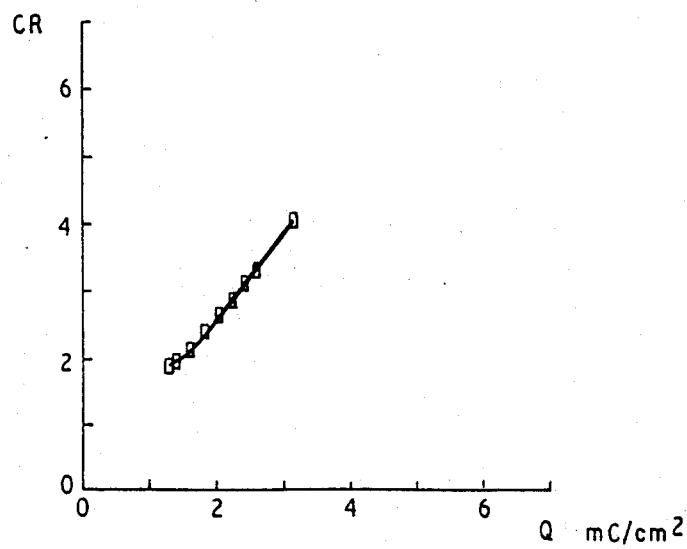

In the same way as in the Comparative Example, a series of experiments were then carried out, at a temperature of 32° C., in which selected display electrodes were written at a range of charge densities for intervals of 2, 3 and 4 mS. For each charge density applied, the brightness of the written and unwritten electrodes was measured with a spot meter and photopically corrected contrast ratios were calculated. The variation in contrast ratio of the selected display electrodes with applied charge is shown in FIGS. 4, 5 and 6 (4, 3 and 2 mS respectively). For the 4 mS, write time it will be noted that a contrast ratio of 6:1 was achieved corresponding to the passage of 6.3 mCcm$^{-2}$ of charge per unit area of the written electrodes. The contrast ratio/charge curves of FIGS. 4–6 do not indicate the onset of side reactions.

The absence of side reactions was further confirmed by cycling the display through a similar 4 mS write at 1 Acm$^{-2}$, 1 second hold, potentiostatic erase cycle to that of the Comparative Example. The erase time was 35 mS when the display electrodes were driven to +350 mV with respect to the redox potential for the viologen $V^{++} \rightarrow V^{+\cdot}$ reduction to effect the erasure.

The display was further tested under realistic operating conditions using a cyle of 4 mS write time and a current density of 1 Acm$^{-2}$, a variable hold period of between 2 and 30 seconds and potentiostatic erasure at +350 mV with respect to the viologen reduction potential as determined by the reference electrode. Over 700,000 fully reversible cycles have been achieved. Over this number of cycles a contrast ratio of 4.5:1 was achieved which did not deteriorate significantly and even appeared to increase slightly. The erase time remained in the range of 34–40 mS. Over an extended hold period of one minute, the contrast ratio of 4.5:1 decreased to 3.6:1.

When certain of the above experiments were repeated at different temperatures it was found that the temperature could be increased to 45° C. without affecting display performance. At higher temperatures performance deteriorated in that a blue haze was formed at the display electrodes.

Although for experimental convenience, the above experiments were carried out in the simple 7×8 cell described, all have been repeated and the results confirmed, as far as practicable, in the more complex display device of FIGS. 1 and 2.

EXAMPLE 2

Figure 7:
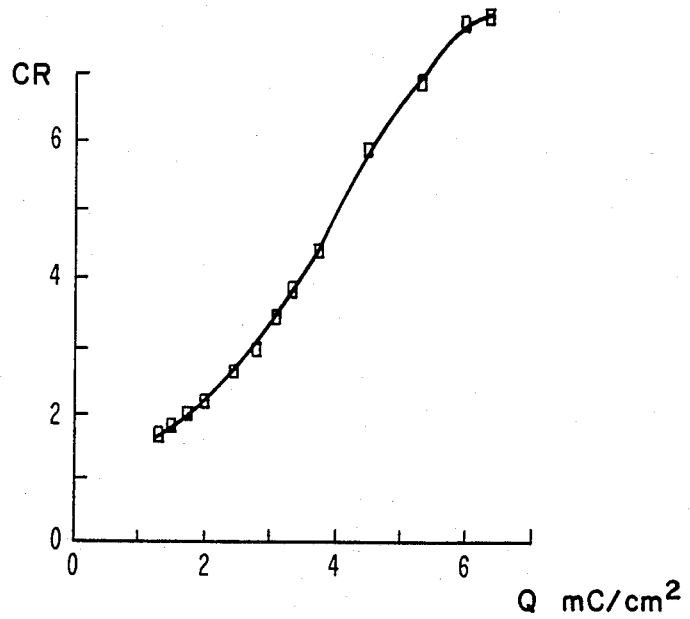
FIG. 7 is a graph, for a given write time, showing the variation of contrast ratio with applied charge density for a display device similar to that of FIGS. 1 and 2 employing an electrochromic solution catalysed by cadmium according to the invention.

A further electrolyte for use in a display device according to the invention was made by dissolving cadmium sulphate in 0.5 molar sodium sulphate, adjusting the pH to 5.2 and adding di-heptyl bipyridinium hypophosphite to produce a solution whose essential components were in the following concentration:

di-heptyl bipyridinium cations: 0.05 molar
sulphate: 1.1 molar
cadmium: 0.1 molar A 7×9 matrix experimental cell, as used in Example 1, was filled with the above solution and contrast ratio/charge density measurements made at a temperature of 28° C. in the same manner as in the preceding Examples. The results are shown in FIG. 7 from which it can be seen that a contrast ratio of 7.9 was achieved for a charge density of 6.3 mCcm$^{-2}$.

Further rigorous cycling of the display through a 4 mC,1 Acm$^{-2}$ write step, a 1 second hold period and a +350 mV potentiostatic erase with respect to the viologen dication reduction potential was carried out for 1000 cycles. No hydrogen was evolved but the display was less stable than that using thallium in that the contrast ratio declined more rapidly when a longer hold period was introduced.

We claim:

1. An electrolytic display device having an electrolytic display cell, a solution contained in said cell comprising electrochromically active bipyridinium di-cations, thallium ions present in greater molar concentration than the bipyridinium di-cations and which have a reduction potential more negative than the reduction potential of the bipyridinium di-cations, and oxy-anions of phosphorus also present in greater molar concentration than said bipyridinium di-cations, the device further comprising at least one display electrode and a counter electrode, both within said cell, and display writing means for passing an electric current between said counter electrode and said display electrode so as to drive the display electrode to a potential more negative than the reduction potential of the metal ions whereby said metal ions are electrolytically reduced at said electrode, the metal in its reduced state being effective to reduce chemically said bipyridinium di-cations to their electrochromically colored state.

2. An electrolytic display device according to claim 1, in which said bipyridinium di-cations are di-heptyl bipyridinium di-cations and said oxy-anions of phosphorus comprise hypophosphite and phosphate anions.

3. An electrolytic display device as claimed in claim 2, in which said di-heptyl bipyridinium di-cations are in 0.05 molar concentration, said thallium ions are in 0.2 molar concentration, said hypophosphite anions are in molar concentration and said phosphate anions are in 0.8 molar concentration.

4. An electrolytic display device having an electrolytic display cell, a solution contained in said cell comprising electrochromically active bipyridinium di-cations, cadmium ions present in greater molar concentration than the bipyridinium di-cations and which have a reduction potential more negative than the reduction potential of the bipyridinium di-cations, and sulphate anions also present in greater molar concentration than said bipyridinium di-cations, the device further comprising at least one display electrode and a counter electrode, both within said cell, and display writing means for passing an electric current between said counter electrode and said display electrode so as to drive the display electrode to a potential more negative than the reduction potential of the metal ions whereby said metal ions are reduced at said electrode, the metal in its reduced state being effective to reduce chemically said bipyridinium di-cations to their electrochemically colored state.

5. An electrolytic display device according to claim 4 in which said bipyridinium di-cations are di-heptyl bipyridinium di-cations and in which said solution further comprises hypophosphite anions.

6. An electrolytic display device according to claim 5 in which said di-heptyl bipyridinium di-cations are in 0.05 molar concentration, said sulphate anions are in 1.1 molar concentration and said cadmium ions are in 0.1 molar concentration.

* * * * *